（12）United States Patent
Otsubo (10) Patent No.: US 10,411,823 B2
(45) Date of Patent: Sep. 10, 2019

(54) OPTICAL TRANSMITTER AND OPTICAL RECEIVER

(71) Applicant: Fujitsu Optical Components Limited, Kawasaki-shi, Kanagawa (JP)

(72) Inventor: Koji Otsubo, Yokohama (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 15/970,976

(22) Filed: May 4, 2018

(65) Prior Publication Data

US 2018/0337744 A1    Nov. 22, 2018

(30) Foreign Application Priority Data

May 16, 2017 (JP) .................... 2017-097290

(51) Int. Cl.
| H04J 14/02 | (2006.01) |
| H04B 10/60 | (2013.01) |
| H04B 10/50 | (2013.01) |
| H04B 10/67 | (2013.01) |

(52) U.S. Cl.
CPC ............ *H04J 14/02* (2013.01); *H04B 10/503* (2013.01); *H04B 10/506* (2013.01); *H04B 10/60* (2013.01); *H04B 10/675* (2013.01); *H04J 14/0256* (2013.01)

(58) Field of Classification Search
None
See application file for complete search history.

(56) References Cited

U.S. PATENT DOCUMENTS

| 6,563,976 B1 * | 5/2003 | Grann ................ G02B 6/29311 |
| | | 385/24 |
| 2004/0120720 A1 * | 6/2004 | Chang .................. H04B 10/43 |
| | | 398/139 |
| 2012/0163820 A1 * | 6/2012 | Dangui .............. H04B 10/5161 |
| | | 398/79 |
| 2014/0346323 A1 | 11/2014 | Fujimura et al. |
| 2015/0071638 A1 * | 3/2015 | Heroux .............. H04B 10/2504 |
| | | 398/79 |
| 2015/0300614 A1 | 10/2015 | Tamura et al. |
| 2016/0147017 A1 | 5/2016 | Tamura |
| 2016/0246008 A1 * | 8/2016 | Tan .................... G02B 6/29365 |
| 2016/0269808 A1 | 9/2016 | Du et al. |
| 2017/0131474 A1 * | 5/2017 | Dannenberg ............ H04J 14/02 |
| 2018/0017745 A1 * | 1/2018 | Lin ...................... G02B 6/4246 |
| 2018/0059446 A1 * | 3/2018 | Kim .................... G02B 6/12004 |

FOREIGN PATENT DOCUMENTS

JP        2016-100360        5/2016

* cited by examiner

Primary Examiner — Nathan M Cors
Assistant Examiner — David W Lambert
(74) Attorney, Agent, or Firm — Staas & Halsey LLP

(57) ABSTRACT

An optical transmitter includes: a plurality of laser diodes each of which outputs signal light having a wavelength that is different from a wavelength of other signal light; an optical multiplexer that is disposed adjacently to the laser diodes along a first direction, and that multiplexes the signal light output from the respective laser diodes; and a driving circuit that is disposed adjacently to the optical multiplexer along a second direction that is different from the first direction, and that drives the laser diodes. The optical multiplexer and the driving circuit are integrated.

8 Claims, 8 Drawing Sheets

OPTICAL TRANSMITTER AND OPTICAL RECEIVER

CROSS-REFERENCE TO RELATED APPLICATION

This application is based upon and claims the benefit of priority of the prior Japanese Patent Application No. 2017-097290, filed on May 16, 2017, the entire contents of which are incorporated herein by reference.

FIELD

The embodiments discussed herein are related to an optical transmitter and an optical receiver.

BACKGROUND

In the field of optical telecommunications, wavelength division multiplexing (WDM), in which optical signals at a plurality of wavelengths are transmitted over one optical fiber, has been used for communicating a large amount of information. According to the 100 G-bps Ethernet (100 GE) standard, four optical signals each of which is capable of communicating information at 25.8 Gbps are communicated over one optical fiber, but some communication standards over 100 GE have recently been developed. For example, the 400-Gbps Ethernet (400 GE) uses the 4-level pulse amplitude modulation (PAM4) WDM as a standard so that eight optical signals each of which is capable of communicating information at 25.8 Gbps are transmitted over one optical fiber.

Furthermore, also known is a technology for reducing the size of an optical transmitter including laser diodes that output optical signals, a driving circuit that drives the laser diodes, and an optical multiplexer that multiplexes the optical signals output from the respective laser diodes, to output an optical transmission signal (see U.S. Patent Application Publication No. 2016/147017, U.S. Patent Application Publication No. 2016/269808, and U.S. Patent Application Publication No. 2015/0300614, for example). Furthermore, also known is a technology for reducing the size of an optical receiver including an optical demultiplexer that demultiplexes an optical reception signal, photodiodes that convert the demultiplexed optical signals into electrical signals, and a transimpedance amplifier that amplifies the converted electrical signals (see U.S. Patent Application Publication No. 2014/346323, U.S. Patent Application Publication No. 2016/0147017, and Japanese Laid-open Patent Publication No. 2016-100360, for example).

In the field of optical telecommunications, there are demands for higher communication rates, and size reductions in optical transmitters and optical receivers.

SUMMARY

According to an aspect of an embodiment, an optical transmitter includes: a plurality of laser diodes each of which outputs signal light having a wavelength that is different from a wavelength of other signal light; an optical multiplexer that is disposed adjacently to the laser diodes along a first direction, and that multiplexes the signal light output from the respective laser diodes; and a driving circuit that is disposed adjacently to the optical multiplexer along a second direction that is different from the first direction, and that drives the laser diodes, wherein the optical multiplexer and the driving circuit are integrated.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments will be explained with reference to accompanying drawings. The technical scope of the present invention is, however, not limited to these embodiments.

Optical Transmitter and Optical Receiver Relevant to Optical Transmitter and Optical Receiver According to Embodiments Before explaining the optical transmitter and the optical receiver according to the embodiments, an optical transmitter and an optical receiver relevant to the optical transmitter and the optical receiver according to the embodiments will now be explained.

Figure 1A:
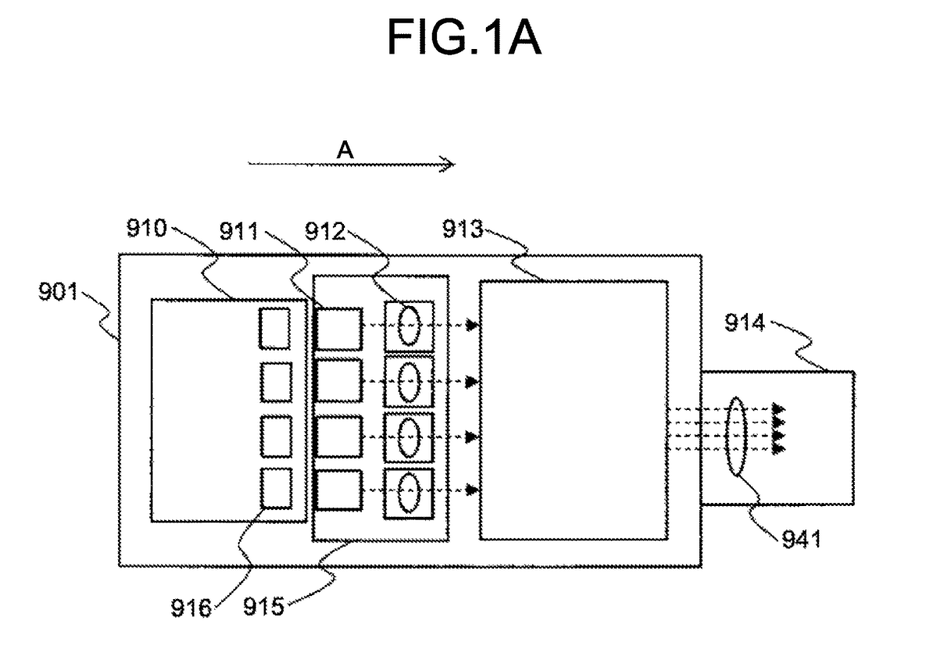
FIG. 1A is a plan view of an optical transmitter relevant to an optical transmitter according to embodiments.
Figure 1B:
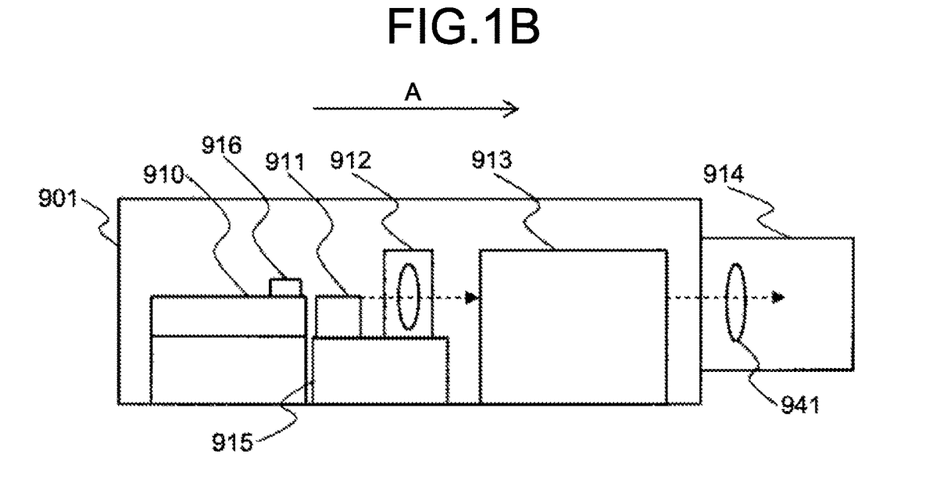
FIG. 1B is a side view of the optical transmitter illustrated in FIG. 1A.

FIG. 1A is a plan view of the optical transmitter relevant to the optical transmitter according to the embodiments, and FIG. 1B is a side view of the optical transmitter illustrated in FIG. 1A.

An optical transmitter 901 includes a laser diode (LD) driver 910, four laser diodes 911, four lenses 912, an optical multiplexer 913, a receptacle 914, a thermoelectric cooler 915, and four photodiodes 916. The LD driver 910 supplies currents to the four laser diodes 911, driving the four laser diodes 811 thereby, based on instructions from a control device not illustrated. Each of the four laser diodes 911 is a directly modulated laser (DML), and outputs an optical signal having an optical power corresponding to the current supplied from the LD driver 910. Each of the four laser diodes 911 outputs an optical signal having a different wavelength.

Each of the four lenses 912 collimates the optical signal output from corresponding one of the four laser diodes 911, and outputs the collimated optical signal to the optical multiplexer 913. The optical multiplexer 913 is an optical waveguide multiplexer, for example, and multiplexes the optical signals received from the four respective laser diodes 911, and outputs the multiplexed signal to the receptacle 914, as an optical transmission signal. The receptacle 914 has a lens 941, and outputs the optical transmission signal multiplexed by the optical multiplexer 913 to a transmission path, such as an optical fiber, not illustrated. The thermoelectric cooler 915 is a Peltier element also referred to as a thermoelectric cooler (TEC), and is placed under the four laser diodes 911. The thermoelectric cooler 915 cools the four laser diodes 911 in response to the current supply from a current supplying device not illustrated. The four photodiodes 916 are disposed correspondingly to the four respective laser diodes 911, and output currents corresponding to the optical outputs of the optical signals output from the four respective laser diodes 911, to the control device not illustrated.

In the optical transmitter 901, the LD driver 910, the four laser diodes 911, the four lenses 912, and the optical multiplexer 913 are lined up in a row, along a signal-transmitting direction indicated by the arrow A in FIGS. 1A and 1B.

Figure 2A:
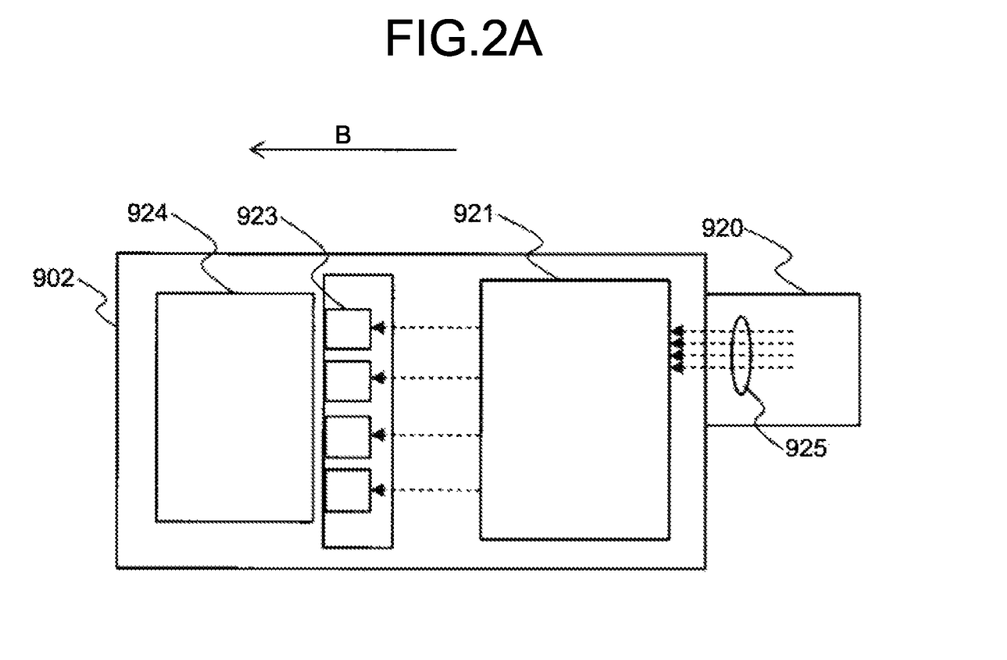
FIG. 2A is a plan view of an optical receiver relevant to an optical receiver according to the embodiments.
Figure 2B:
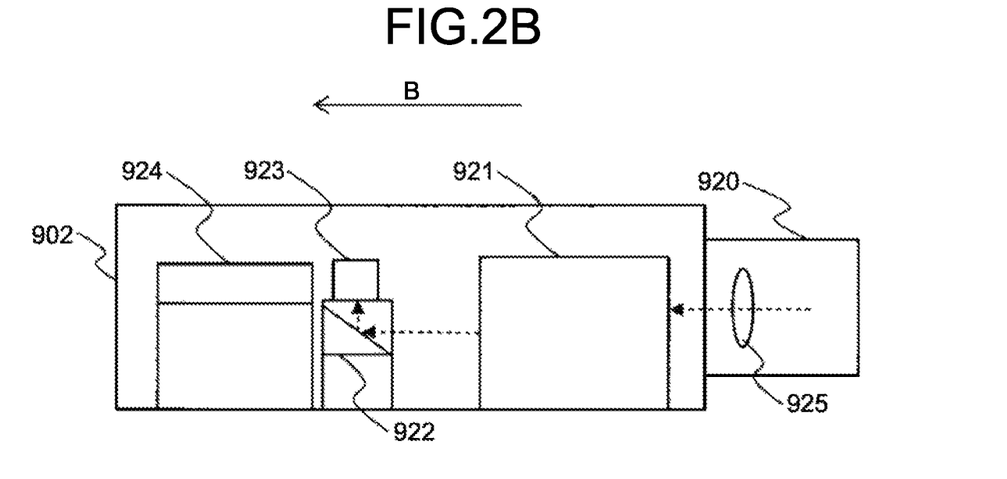
FIG. 2B is a side view of the optical receiver illustrated in FIG. 2A.

FIG. 2A is a plan view of an optical receiver relevant to an optical receiver according to the embodiment. FIG. 2B is a side view of the optical receiver illustrated in FIG. 2A.

The optical receiver 902 includes a receptacle 920, an optical demultiplexer 921, a prism 922, four photodiodes 923, and a transimpedance amplifier 924. The receptacle 920 has a lens 925, and receives optical reception signal from the transmission path, such as the optical fiber, not illustrated. The optical demultiplexer 921 is, for example, an optical waveguide demultiplexer, and demultiplexes the optical reception signal received from the receptacle 920, and outputs the demultiplexed four optical signals to the prism 922. The prism 922 is, for example, a totally reflecting prism, and outputs the four optical signals received from the optical demultiplexer 921 to the four respective photodiodes 923.

The four photodiodes 923 are photoelectric conversion elements each of which converts the optical signal received via the prism 922 to a current signal. Each of the four photodiodes 923 outputs a current corresponding to the optical power of the received optical signal to the transimpedance amplifier 924. The transimpedance amplifier 924 is also referred to as a TIA, and converts the current signals, which are converted from the respective optical signals by the four photodiodes 923, into voltage signals, amplifies the voltage signals, and outputs the resultant signals to the control device not illustrated.

In the optical receiver 902, the receptacle 920, the optical demultiplexer 921, the four photodiodes 923, and the transimpedance amplifier 924 are lined up in a row, along the signal-transmitting direction indicated by the arrow B in FIGS. 2A and 2B.

In the optical transmitter 901 and the optical receiver 902, because the components are lined up in a row along the optical-signal-transmitting direction, any further size reduction is not easily achievable. Furthermore, in an optical transmitter and an optical receiver that are compliant to a standard compatible to a higher communication rate, such as 400 GE, a larger number of components are used. Therefore, it is not easy to reduce the size of such an optical transmitter and an optical receiver.

Overview of Optical Transmitter and Optical Receiver According to Embodiment

In an optical transmitter according to the embodiments, an optical multiplexer and an LD driver are disposed adjacently to each other along a second direction that is different from a first direction that is the direction along which a plurality of laser diodes and the optical multiplexer are in adjacency, and the optical multiplexer and the LD driver are integrated with each other. By disposing the optical multiplexer and the LD driver adjacently to each other along the second direction that is different from the first direction that is the direction in which the laser diodes and the optical multiplexer are in adjacency, and integrating the optical multiplexer and the LD driver, the optical transmitter according to the embodiment can be reduced in size.

Furthermore, in an optical receiver according to the embodiments, an optical demultiplexer and a transimpedance amplifier are disposed adjacently to each other along the second direction that is different from the first direction that is the direction in which the optical demultiplexer and the photodiode are in adjacency, and the optical demultiplexer and the transimpedance amplifier are integrated with each other. By disposing the optical demultiplexer and the transimpedance amplifier adjacently to each other in the second direction that is different from the first direction that is the direction in which the optical demultiplexer and the photodiodes are in adjacency, the optical receiver according to the embodiment can be reduced in size.

Configuration and Function of Optical Transmitter According to First Embodiment

Figure 3A:
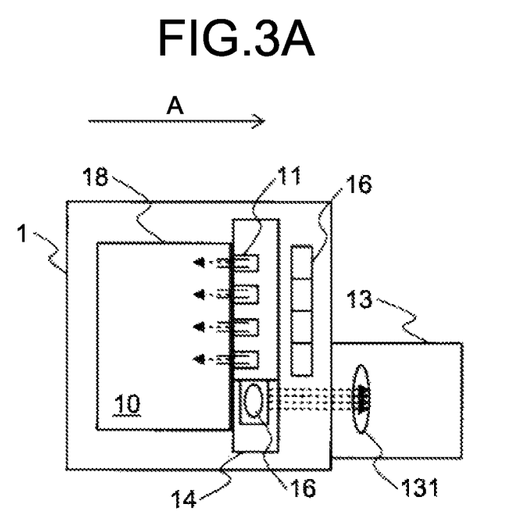
FIG. 3A is a plan view of an optical transmitter according to a first embodiment.
Figure 3B:
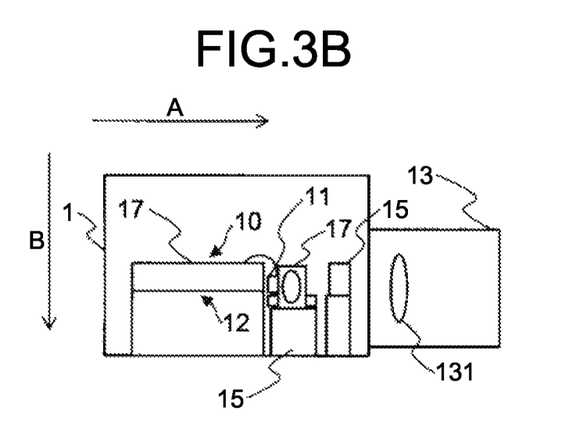
FIG. 3B is a side view of the optical transmitter illustrated in FIG. 3A.
Figure 3C:
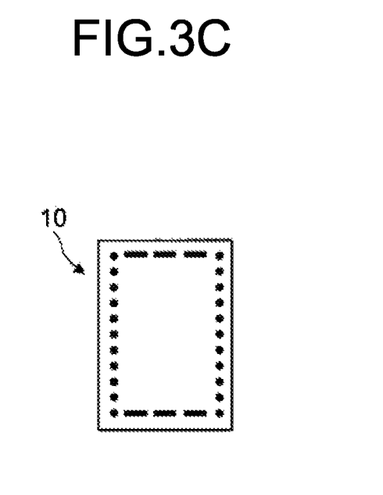
FIG. 3C is a plan view of an LD driver illustrated in FIG. 3A.
Figure 3D:
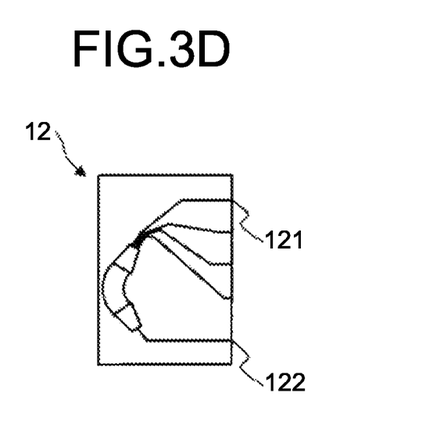
FIG. 3D is a plan view of an optical multiplexer illustrated in FIG. 3A.

FIG. 3A is a plan view of an optical transmitter according to a first embodiment. FIG. 3B is a side view of the optical transmitter illustrated in FIG. 3A. FIG. 3C is a plan view of the LD driver illustrated in FIG. 3A. FIG. 3D is a plan view of the optical multiplexer illustrated in FIG. 3A.

The optical transmitter 1 includes an LD driver 10, four laser diodes 11, an optical multiplexer 12, a receptacle 13, a thermoelectric cooler 14, four photodiodes 15, and a lens 16. The LD driver 10 is disposed on the front side of a silicon substrate 17, and the optical multiplexer 12 is disposed on the rear side of the silicon substrate 17. The LD driver 10 and the optical multiplexer 12 are integrated with each other with the LD driver 10 disposed on the front side and the optical multiplexer 12 disposed on the rear side of one silicon substrate 17.

The LD driver 10 is a driving circuit that drives the four laser diodes 11 by supplying a current to each of the four laser diodes 11 based on instructions from the control device not illustrated. The LD driver 10 is an integrated circuit that is implemented as a complementary metal-oxide semiconductor (CMOS) device, for example, and is disposed on the front surface of the silicon substrate 17.

Each of the four laser diodes 11 is a directly modulated laser, and outputs an optical signal with an optical power corresponding to the current supplied from the LD driver 10. Each of the four laser diodes 11 outputs an optical signal having a different wavelength from those of the others. As an example, the wavelengths of the optical signals output from the four laser diodes 11 are 1295 [nm], 1300 [nm], 1305 [nm], and 1310 [nm]. Explained herein is an embodiment in which the four laser diodes 11 are disposed, but the number of laser diodes to be disposed may be any number other than four and more than one, such as eight.

The optical multiplexer 12 outputs an optical transmission signal that is a result of multiplexing the optical signals received from the four respective laser diodes 11 to the receptacle 13 via the lens 16. The optical multiplexer 12 is disposed adjacently to the four laser diodes 11 along the first direction indicated with an arrow A illustrated in FIGS. 3A and 3B. The optical multiplexer 12 is disposed adjacently to the LD driver 10 in the second direction that is indicated with the arrow B, and that is perpendicular to the first direction indicated with the arrow A, as illustrated in FIGS. 3A and 3B.

The optical multiplexer 12 is an optical waveguide multiplexer, and is disposed on the rear side of the silicon substrate 17. The optical multiplexer 12 includes four input ports 121 that are provided on a facing surface positioned in a manner facing the four respective laser diodes 11, and an output port 122 provided on the facing surface. In other words, in the optical multiplexer 12, the four input ports 121 and the one output port 122 are both provided on the facing surface facing the four laser diodes 11.

Each of the input ports 121 of the optical multiplexer 12 is disposed in such a manner that the optical coupling between the input port 121 and the corresponding laser diode 11 form a butt joint. In other words, the input ports 121 of the optical multiplexer 12 are disposed in a manner abutting against the respective laser diodes 11.

The receptacle 13 includes a housing made of a stainless steel, for example, and a lens 131, and outputs the optical transmission signal multiplexed by the optical multiplexer 12 to a transmission path, such as an optical fiber, not illustrated. The thermoelectric cooler 14 is a Peltier element, is placed under the four laser diodes 11, and cools the four laser diodes 11 in response to the current supply from a current supplying device not illustrated. The four photodiodes 15 are disposed correspondingly to the four respective laser diodes 11, and output currents corresponding to the optical outputs of the optical signals output from the four respective laser diodes 11, to the control device not illustrated. The lens 16 is positioned in a manner facing the output port 122 of the optical multiplexer 12, collimates the optical transmission signal output from the optical multiplexer 12, and outputs the collimated signal to the receptacle 13.

Advantageous Effects Achieved by Optical Transmitter According to First Embodiment With the LD driver 10 and the optical multiplexer 12 disposed on the same silicon substrate, the optical transmitter 1 can be reduced in size. In other words, in the optical transmitter 1, the LD driver 10 is disposed adjacently to the optical multiplexer 12 in the second direction that is perpendicular to the first direction that is the direction along which the optical multiplexer 12 and the four laser diodes 11 are disposed. By disposing in the second direction, the optical transmitter 1 can be reduced in size.

Furthermore, the input ports 121 and the output port 122 of the optical multiplexer 12 are disposed on the facing surface positioned in a manner facing the laser diodes 11. By disposing the lens 16 and the laser diodes 11 side by side, the optical transmitter 1 can be further reduced in size.

Furthermore, by integrating the LD driver 10 and the optical multiplexer 12 with the LD driver 10 and optical multiplexer 12 disposed on the one substrate, the optical transmitter 1 can be further reduced in size.

Furthermore, with the optical transmitter 1, because the input ports 121 of the optical multiplexer 12 are disposed in a manner abutting against the respective laser diodes 11, the length of the electrical wiring connecting the LD driver 10, which is disposed on the opposite side of the optical multiplexer 12, and the laser diodes 11 can be reduced. With the optical transmitter 1, a high-speed operation can be achieved by reducing the length of the electrical wiring connecting the LD driver 10 and the laser diodes 11 by disposing input ports 121 of the optical multiplexer 12 in a manner abutting against the respective laser diodes 11.

Figure 4A:
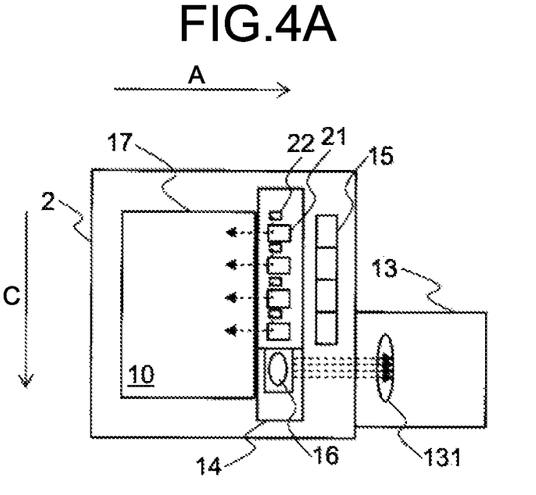
FIG. 4A is a plan view of an optical transmitter according to a second embodiment.
Figure 4B:
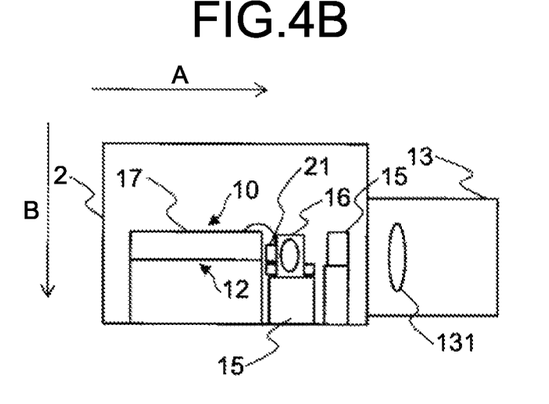
FIG. 4B is a side view of the optical transmitter illustrated in FIG. 4A.
Figure 4C:
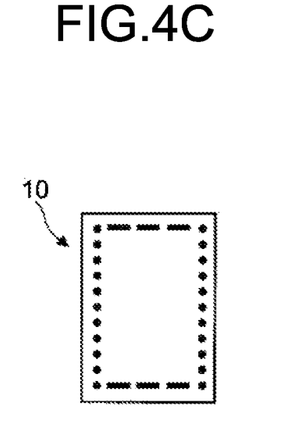
FIG. 4C is a plan view of the LD driver illustrated in FIG. 4A.
Figure 4D:
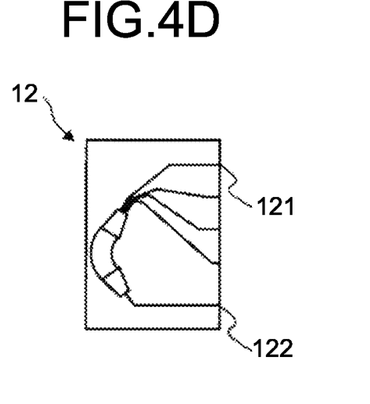
FIG. 4D is a plan view of the optical multiplexer illustrated in FIG. 4A.

Configuration and Function of Optical Transmitter According to Second Embodiment FIG. 4A is a plan view of an optical transmitter according to a second embodiment. FIG. 4B is a side view of the optical transmitter illustrated in FIG. 4A. FIG. 4C is a plan view of the LD driver illustrated in FIG. 4A. FIG. 4D is a plan view of the optical multiplexer illustrated in FIG. 4A.

This optical transmitter 2 is different from the optical transmitter 1 in including four laser diodes 21 and four terminators 22, instead of the four laser diodes 11. Because the configuration and the function of the components of the optical transmitter 2 other than the four laser diodes 21 and the four terminators 22 are the same as those of the components of the optical transmitter 1 assigned with the same reference numerals, detailed explanations thereof will be omitted.

Each of the four laser diodes 21 is a modulator integrated laser having an electro-absorption (EA) modulator, and outputs an optical signal modulated based on a modulation signal received from the control device not illustrated. Modulator integrated lasers are used in long-distance transmissions, in contrast to the directly modulated lasers. Each of the four terminators 22 has a resistance of 50 ohms, and suppresses reflection of the modulation signal input from the control device not illustrated. The four terminators 22 and the four laser diodes 21 are disposed alternatingly in a third direction that is in parallel with the direction in which the facing surface of the optical multiplexer 12 extends, as indicated with the arrow C in FIG. 4A.

Advantageous Effects Achieved by Optical Transmitter According to Second Embodiment The optical transmitter 2 is suitable for long-distance transmissions, compared with the optical transmitter 1 in which the laser diodes 11 are directly modulated lasers, because the optical transmitter 2 uses the laser diodes 21 that are modulator integrated lasers.

Configuration and Function of Optical Transmitter According to Third Embodiment

Figure 5A:
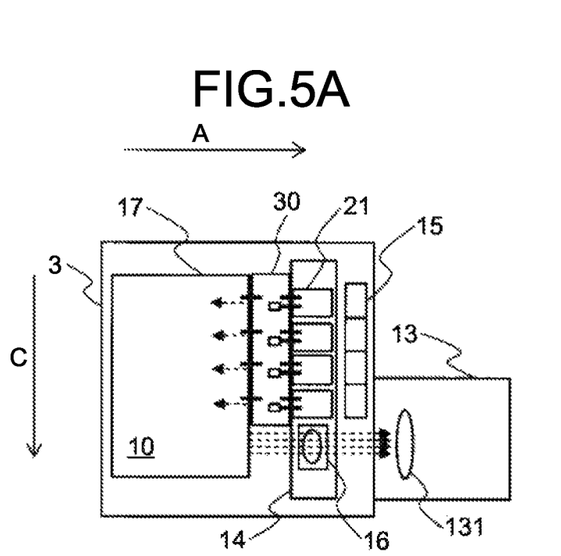
FIG. 5A is a plan view of an optical transmitter according to a third embodiment.
Figure 5B:
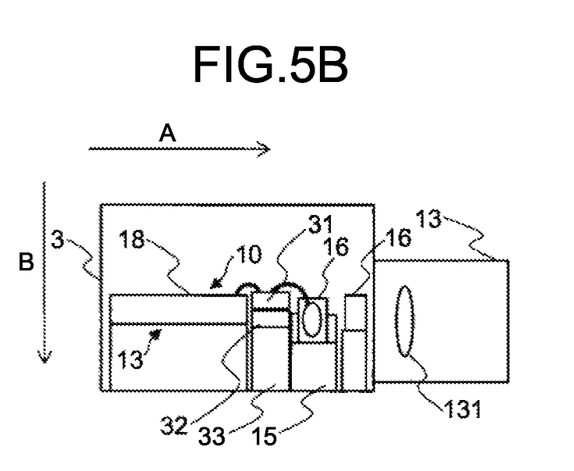
FIG. 5B is a side view of the optical transmitter illustrated in FIG. 5A.
Figure 5C:
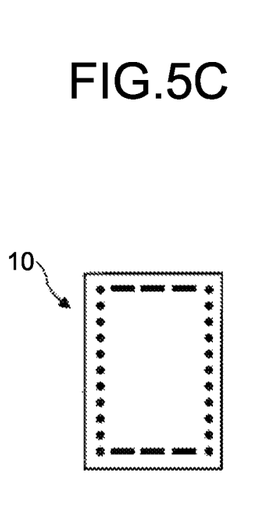
FIG. 5C is a plan view of the LD driver illustrated in FIG. 5A.
Figure 5D:
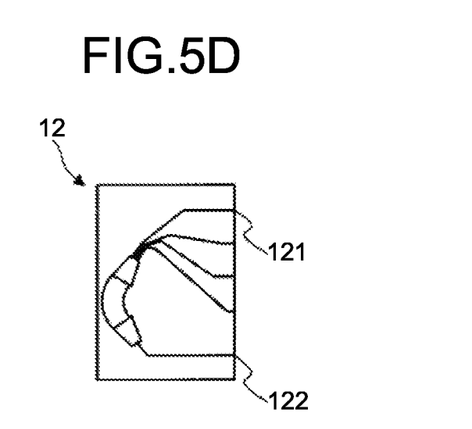
FIG. 5D is a plan view of the optical multiplexer illustrated in FIG. 5A.

FIG. 5A is a plan view of an optical transmitter according to a third embodiment. FIG. 5B is a side view of the optical transmitter illustrated in FIG. 5A. FIG. 5C is a plan view of the LD driver illustrated in FIG. 5A. FIG. 5D is a plan view of the optical multiplexer illustrated in FIG. 5A.

This optical transmitter 3 is different from the optical transmitter 1 in including a laminated member 30 instead of the four terminators 22. Because the configuration and the function of the components of the optical transmitter 2 other than the laminated member 30 are the same as those of the components of the optical transmitter 1 assigned with the same reference numerals, detailed explanations thereof will be omitted.

The laminated member 30 includes an RF line substrate 31, a waveguide substrate 32, and a backing 33. The RF line substrate 31, the waveguide substrate 32, and the backing 33 may be laminated on top of one another, or bonded with an adhesive agent, for example.

Four resistance elements each of which has a resistance of 50 ohms, which is the same resistance as that of the four terminators 22, are disposed on the RF line substrate 31. The four resistance elements disposed on the RF line substrate 31 function as terminators for the four respective laser diodes 21.

The waveguide substrate 32 has four waveguides each of which is made from a member transmitting optical signals, such as glass or an optical fiber, and the optical signals output from the four respective laser diodes 21 become incident on the respective input ports 121 on the optical multiplexer 12, via these four respective waveguides. A spot-size converter is provided on one end of each of the four waveguides on the waveguide substrate 32, being an end on the side of the laser diodes 21. By providing a spot-size converter to the end of each of the four waveguides disposed on the waveguide substrate 32 on the side of the laser diodes 21, condensing lenses are omitted although the laser diodes 21 and the respective input ports 121 are separated by the waveguide substrate 32.

Advantageous Effects Achieved by Optical Transmitter According to Third Embodiment In the optical transmitter 3, because the laser diodes 21 can be disposed adjacently to each other without having the terminators 22 therebetween, the length in the third direction indicated with the arrow C in FIG. 5A can be reduced, compared with that in the optical transmitter 2.

Figure 6A:
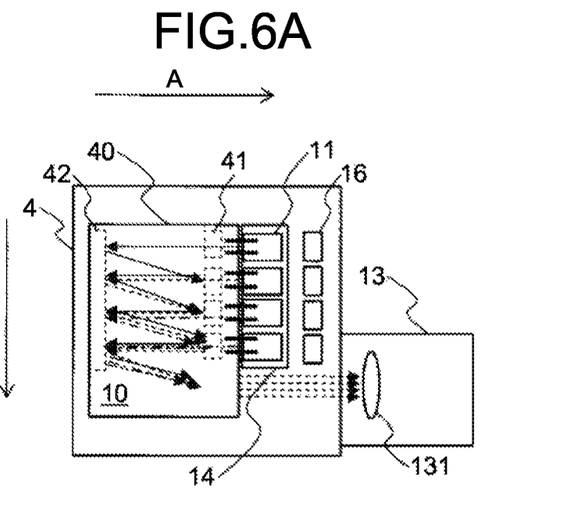
FIG. 6A is a plan view of an optical transmitter according to a fourth embodiment.
Figure 6B:
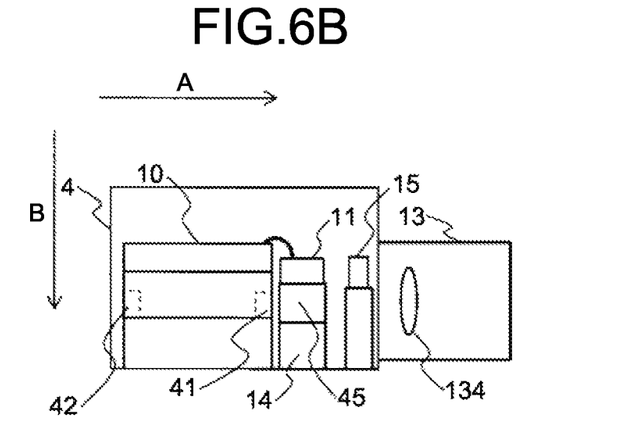
FIG. 6B is a side view of the optical transmitter illustrated in FIG. 6A.
Figure 6C:
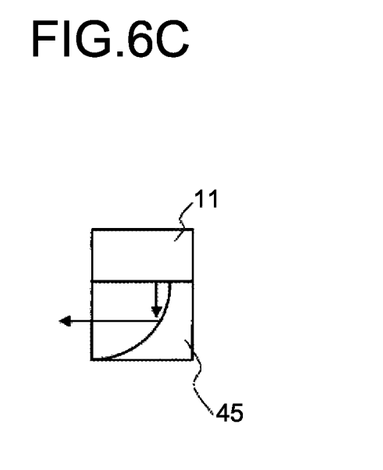
FIG. 6C is a partial enlarged view of the laser diodes and the concave mirror illustrated in FIG. 6B.

Configuration and Function of Optical Transmitter According to Fourth Embodiment FIG. 6A is a plan view of an optical transmitter according to a fourth embodiment. FIG. 6B is a side view of the optical transmitter illustrated in FIG. 6A. FIG. 6C is a partial enlarged view of the laser diodes and the concave mirror illustrated in FIG. 6B.

This optical transmitter 4 is different from the optical transmitter 1 in that an optical multiplexer 40 is provided as a spatial optical system, instead of the optical multiplexer 12 that is a waveguide multiplexer. The optical transmitter 4 is also different from the optical transmitter 1 in including a concave mirror 45. Because the configuration and the function of the components of the optical transmitter 4 other than the optical multiplexer 40 and the concave mirror 45 are the same as those of the components of the optical transmitter 1 assigned with the same reference numerals, detailed explanations thereof will be omitted. In the optical transmitter 4, it is preferable for the laser diodes 11 to be surface emitting lasers, such as vertical cavity surface emitting lasers (VCSELs).

The optical multiplexer 40 includes four filters 41 and a mirror 42. The four filters 41 are disposed along a side facing the laser diodes 11 in the LD driver 10, in a manner facing the respective laser diodes 11. Each of the four filters 41 is a band-pass filter that transmits light having the same wavelength as that of the optical signal output from corresponding one of the laser diodes 11, and reflects the light at other wavelengths.

The mirror 42 is a reflector element that is disposed in a manner extending along a side of the LD driver 10 facing the side along which the four filters 41 are disposed. The mirror 42 serves as a multiplexing element that multiplexes the optical signals having transmitted through the four filters 41 and the optical signals reflected on the four filters 41, one after another, and outputs the multiplexed four optical signals as an optical transmission signal. In the optical multiplexer 40, optical elements for collimating the optical transmission signal, such as a mirror for correcting the direction in which the optical transmission signal is output, may be provided, as appropriate.

A first optical signal indicated with a solid line transmits through the first filter 41, then is reflected on the mirror 42 and on the second to the fourth filters 41, one after another, and goes out of the optical multiplexer 40. A second optical signal indicated by a dotted line transmits through the second filter 41, then is reflected on the mirror 42 and on the third to the fourth filters 41, one after another, and goes out of the optical multiplexer 40. A third optical signal indicated by a long dashed short dashed line transmits through the third filter 41, is reflected on the mirror 42 and on the fourth filter 41, and goes out of the optical multiplexer 40. A fourth optical signal indicated with the long dashed double-short dashed line transmits through the fourth filter 41, then is reflected on the mirror 42, and goes out of the optical multiplexer 40.

The concave mirror 45 is positioned below the four laser diodes 11, and changes the direction of the optical signals output from the four laser diodes 11, which is output in the second direction indicated with the arrow B, to a direction opposite to the first direction indicated with the arrow A. At the same time, the concave mirror 45 collimates the optical signals output from the four laser diodes 11, and outputs the collimated signal to the optical multiplexer 40.

Advantageous Effects Achieved by Optical Transmitter According to Fourth Embodiment With the optical transmitter 4, because the optical multiplexer 40 can be manufactured with general-purpose optical elements such as the filters 41 and the mirror 42, the production cost can be kept low.

Furthermore, because the optical transmitter 4 uses the concave mirror 45 that is positioned below the laser diodes 11, as an optical element for collimating the optical signals output from the laser diodes 11, a further size reduction can be achieved.

Configuration and Function of Optical Receiver According to First Embodiment

Figure 7A:
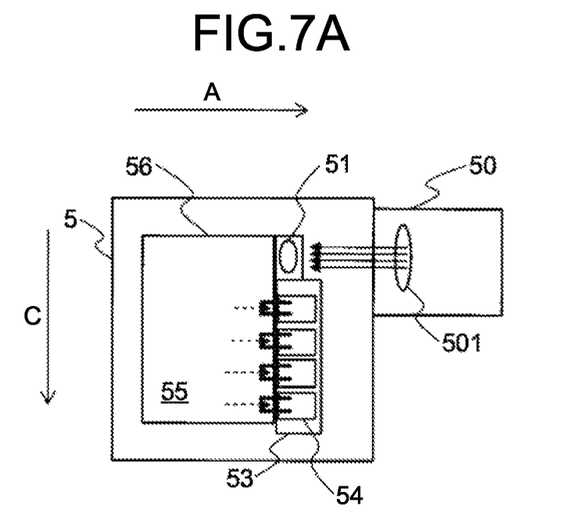
FIG. 7A is a plan view of an optical receiver according to the first embodiment.
Figure 7B:
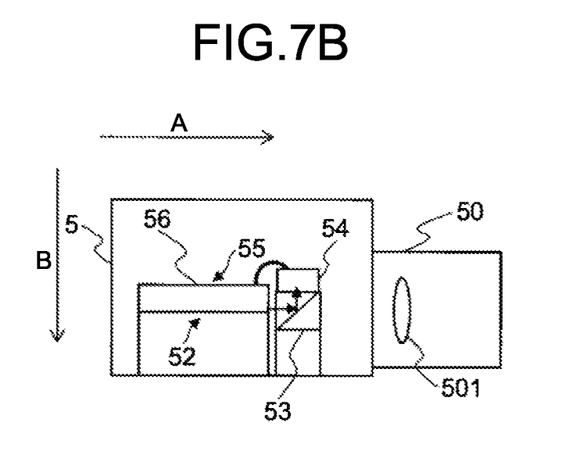
FIG. 7B is a side view of the optical receiver illustrated in FIG. 7A.
Figure 7C:
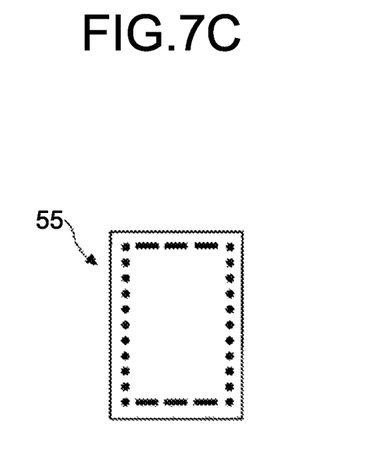
FIG. 7C is a plan view of the transimpedance amplifier illustrated in FIG. 7A.
Figure 7D:
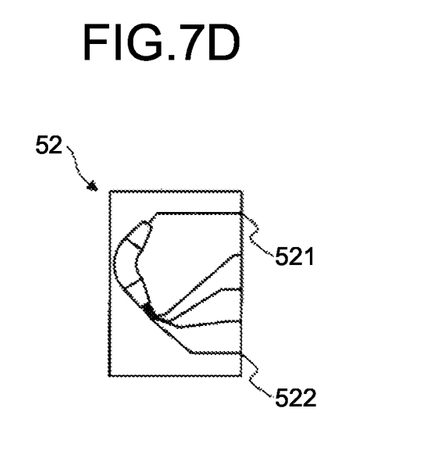
FIG. 7D is a plan view of the optical demultiplexer illustrated in FIG. 7A.

FIG. 7A is a plan view of an optical receiver according to the first embodiment. FIG. 7B is a side view of the optical receiver illustrated in FIG. 7A. FIG. 7C is a plan view of the transimpedance amplifier illustrated in FIG. 7A. FIG. 7D is a plan view of the optical demultiplexer illustrated in FIG. 7A.

The optical receiver 5 includes a receptacle 50, a lens 51, an optical demultiplexer 52, a prism 53, four photodiodes 54, and a transimpedance amplifier 55. The receptacle 50 includes a housing made of a stainless steel, for example, and a lens 501, and receives an optical reception signal from the transmission path, such as an optical fiber, not illustrated. The lens 51 collimates the optical reception signal output from the receptacle 50, and outputs the collimated signal to the optical demultiplexer 52.

The optical demultiplexer 52 is an optical waveguide demultiplexer, and is disposed on the rear side of a substrate 56. The optical demultiplexer 52 demultiplexes the optical reception signal received from the receptacle 50 via the lens 51, and outputs the demultiplexed four optical signals to the prism 53. The optical demultiplexer 52 includes an input port 521 that is formed on the facing surface positioned in a manner facing the lens 51, and four output ports 522 formed on the facing surface, in a manner facing the four respective photodiodes 54. In other words, in the optical multiplexer 12, the one input port 521 and the four output ports 522 are formed on the facing surface positioned in a manner facing the four photodiodes 54. The prism 53 is a totally reflecting prism, for example, and outputs the optical signals received from the four respective output ports 522 of the optical demultiplexer 52, to the four respective photodiodes 54.

The four photodiodes 54 are photoelectric conversion elements each of which converts the optical signal received via the prism 53 to a current signal. Each of the four photodiodes 54 outputs a current corresponding to the optical power of the received optical signal, to the transimpedance amplifier 55.

The transimpedance amplifier 55 is an integrated circuit, which is also referred to as a TIA, that is disposed on the substrate 56, and converts the current signals, converted by the four respective photodiodes 54 into voltage signals, amplifies the voltage signals, and outputs the resultant signals to the control device not illustrated.

Advantageous Effects Achieved by Optical Receiver According to First Embodiment

By integrating the optical demultiplexer 52 and the transimpedance amplifier 55 with the optical demultiplexer 52 and the transimpedance amplifier 55 disposed on the same substrate, the optical receiver 5 can be reduced in size. In other words, in the optical receiver 5, the optical demultiplexer 52 is disposed adjacently to the transimpedance amplifier 55 along the second direction that is perpendicular to the first direction that is the direction along which the optical demultiplexer 52 and the four photodiodes 54 are disposed. By disposing the optical demultiplexer 52 and the transimpedance amplifier 55 in the second direction, the optical receiver 5 can be reduced in size.

Furthermore, in the optical receiver 5, the input port 521 and the output ports 522 of the optical demultiplexer 52 are all formed on the facing surface positioned in a manner facing the four photodiodes 54. By disposing the lens 51 side by side with the photodiodes 54, the optical receiver 5 can be further reduced in size.

Furthermore, by integrating the optical demultiplexer 52 and the four photodiodes 54 with the optical demultiplexer 52 and the four photodiodes 54 disposed on the one substrate, the optical receiver 5 can be further reduced in size.

Configuration and Function of Optical Receiver According to Second Embodiment

Figure 8A:
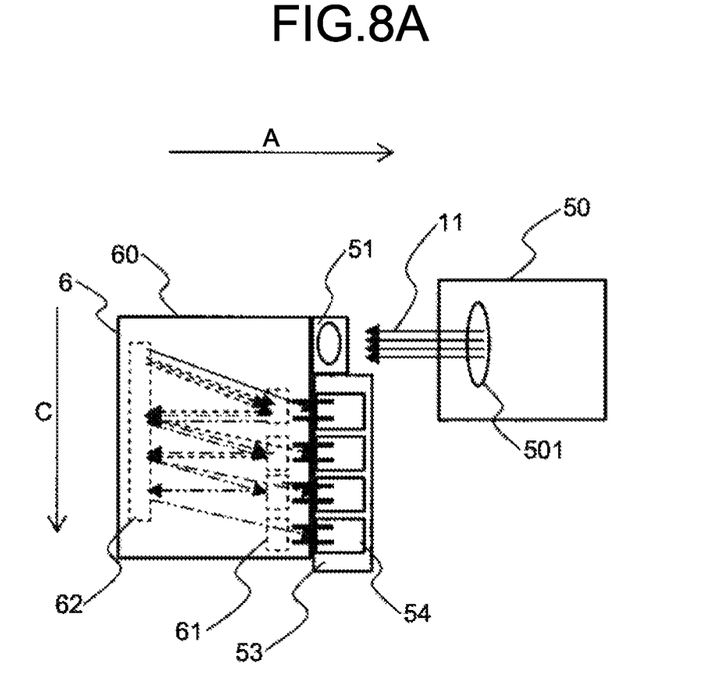
FIG. 8A is a plan view of an optical receiver according to the second embodiment.
Figure 8B:
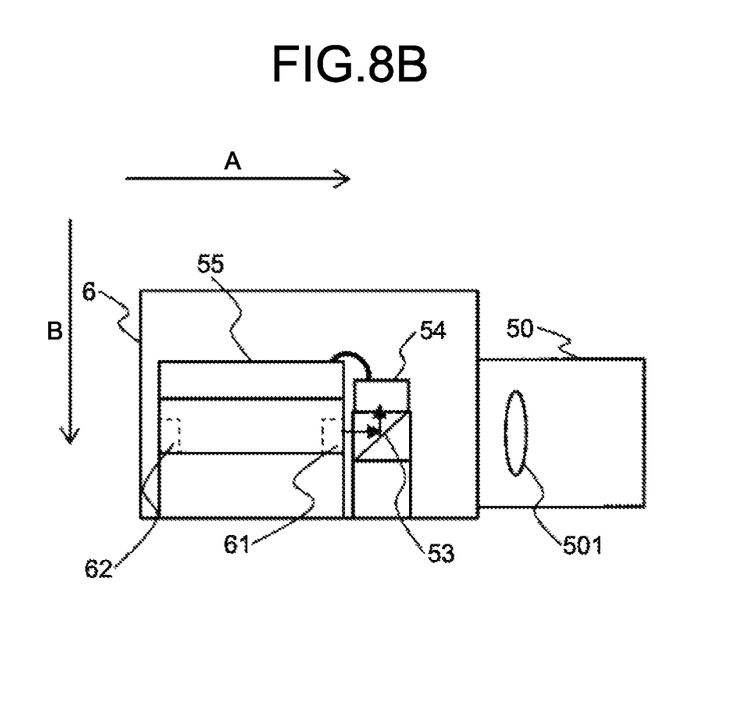
FIG. 8B is a side view of the optical receiver illustrated in FIG. 8A.

FIG. 8A is a plan view of an optical receiver according to the second embodiment. FIG. 8B is a side view of the optical receiver illustrated in FIG. 8A.

This optical receiver 6 is different from the optical receiver 5 in that an optical demultiplexer 60 is provided as a spatial optical system, instead of the optical demultiplexer 52 that is a waveguide demultiplexer. Because the configuration and the function of the components of the optical receiver 6 other than the optical demultiplexer 60 are the same as those of the elements included in the optical receiver 5 assigned with the same reference numerals, detailed explanations thereof will be omitted.

The optical demultiplexer 60 includes four filters 61 and a mirror 62. The four filters 61 are disposed in a manner facing the respective photodiodes 54. Each of the four filters 61 is a band-pass filter that outputs an optical signal at a predetermined wavelength, and reflects optical signals at other wavelengths. Each of the four filters 61 functions as a demultiplexing element that outputs an optical signal transmitted therethrough to the corresponding photodiode 54, via the prism 53. The mirror 62 reflects an optical signal reflected on each of the four filters 61, and outputs the optical signal to the filter 61 that is adjacent to the filter 61 having reflected the optical signal. In the optical demultiplexer 60, optical elements such as a mirror for correcting the direction in which the optical reception signal is output, and a lens for collimating the optical reception signal, for example, may be provided as appropriate.

A first optical signal indicated with a solid line is reflected on the mirror 62, transmits through the first filter 61, and become incident on the first photodiode 54, via the prism 53. A second optical signal indicated by a dotted line is reflected on the first filter 61 and on the mirror 62, transmits through the second filter 61, and becomes incident on the second photodiode 54, via the prism 53. A third optical signal indicated by a long dashed short dashed line is reflected on the first and second filters 61 and on the mirror 62, transmits through the third filter 61, and becomes incident on the third photodiode 54, via the prism 53. A fourth optical signal indicated by a long dashed double-short dashed line is reflected on the first to third filters 61 and on the mirror 62, transmits through the fourth filter 61, and becomes incident on the fourth photodiode 54, via the prism 53.

Advantageous Effects Achieved by Optical Receiver According to Second Embodiment In the optical receiver 6, because the optical demultiplexer 60 can be formed with general-purpose optical elements such as the filters 61 and the mirror 62, the production cost can be kept low.

Modifications of Optical Transmitter and Optical Receiver According to Embodiments In the optical transmitter 1 to 3, the LD driver 10 and the optical multiplexer 12 are disposed on the front side and the rear side, respectively, of the silicon substrate, but in the optical transmitter according to the embodiments, the LD driver and the optical multiplexer may be fabricated separately, and integrated by bonding with an adhesive agent, for example.

Furthermore, in the optical receiver 5, the optical demultiplexer 52 and the transimpedance amplifier 55 are disposed on the front side and the rear side, respectively, of the substrate. However, in the optical receiver according to the embodiments, the optical demultiplexer and the transimpedance amplifier may be fabricated separately, and integrated by bonding the optical demultiplexer and the transimpedance amplifier with an adhesive agent, for example.

Furthermore, in the optical transmitters 1 to 4, the first direction that is the direction along which the laser diodes and the optical multiplexer are disposed intersects perpendicularly with the second direction in which the direction along which the LD driver and the optical multiplexer are disposed. However, in the optical transmitter according to the embodiments, any first direction and second direction may be used, as long as the first direction and the second direction are different. For example, the first direction and the second direction may intersect each other at an angle equal to or more than 80 degrees, and equal to or less than 120 degrees.

Furthermore, in the optical receivers 5 to 6, the first direction that is the direction along which the photodiodes and the optical demultiplexer are disposed intersects perpendicularly with the second direction in which the direction along which the transimpedance amplifier and the optical demultiplexer are disposed. However, in the optical receiver according to the embodiments, any first direction and second direction may be used, as long as the first direction and the second direction are different. For example, the first direction and the second direction may intersect each other at an angle equal to or more than 80 degrees, and equal to or less than 120 degrees.

According to one embodiment, the optical transmitter and the optical receiver can be further reduced in size.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmitter comprising:
a plurality of laser diodes each of which outputs signal light having a wavelength that is different from a wavelength of other signal light;
an optical multiplexer that is disposed adjacently to the laser diodes along a first direction, and that multiplexes the signal light output from the respective laser diodes; and
a driving circuit that is disposed adjacently to the optical multiplexer along a second direction that is different from the first direction, and that drives the laser diodes, wherein
the optical multiplexer and the driving circuit are integrated with each other with the driving circuit disposed on a front side and the optical multiplexer disposed on a rear side of one silicon substrate, wherein
the optical multiplexer includes:
input ports that are formed on a facing surface positioned in a manner facing the respective laser diodes; and
an output port that is formed on the facing surface, wherein
the input ports of the optical multiplexer are disposed in a manner abutting against the respective laser diodes, wherein
with the optical transmitter, the input ports of the optical multiplexer are disposed in a manner abutting against the respective laser diodes, so that respective lengths of electrical wiring directly couple the driving circuit, which is disposed on an opposite side of the optical multiplexer, and the laser diodes.

2. The optical transmitter according to claim 1, wherein the driving circuit is an integrated circuit disposed on a first surface of a substrate, and the optical multiplexer is a waveguide multiplexer that is disposed on a second surface that is on an opposite side of the substrate that is opposite to the first surface.

3. The optical transmitter according to claim 1, wherein the optical multiplexer includes:
a plurality of filters that are positioned in a manner facing the respective laser diodes, and each of which transmits a wavelength of signal light output from the laser diode facing thereto, and that reflects optical signals having wavelengths other than the wavelength of the signal light output from the laser diode facing thereto; and
a multiplexing element that multiplexes the optical signals having transmitted through the respective filters, and the optical signals reflected by the respective filters, one after another, and that outputs the multiplexed optical signals as an optical transmission signal.

4. The optical transmitter according to claim 3, further including a concave mirror that enables the light output from the respective laser diodes to become incident on the respective filters.

5. An optical receiver comprising:
an optical demultiplexer that demultiplexes a received wavelength-multiplexed signal light into a plurality of signal light outputs;
a plurality of photoelectric conversion elements that are positioned adjacently to the optical demultiplexer along a first direction, and that convert the demultiplexed signal light outputs into respective current signals; and
a transimpedance amplifier that is disposed adjacently to the optical demultiplexer along a second direction that is different from the first direction, that converts the current signals converted by the respective photoelectric conversion elements into voltage signals, and that amplifies the voltage signals, wherein
the optical demultiplexer and the transimpedance amplifier are integrated with each other with the optical demultiplexer disposed on a front side and the transimpedance amplifier disposed on a rear side of one silicon substrate.

6. The optical receiver according to claim 5, wherein the optical demultiplexer includes:
output ports that are formed on a facing surface positioned in a manner facing the respective photoelectric conversion elements, and
an input port that is formed on the facing surface.

7. An optical transmitter comprising:
a plurality of laser diodes each of which outputs signal light having a wavelength that is different from a wavelength of other signal light;
an optical multiplexer that is disposed adjacently to the laser diodes along a first direction, and that multiplexes the signal light output from the respective laser diodes; and
a driving circuit that is disposed adjacently to the optical multiplexer along a second direction that is different from the first direction, and that drives the laser diodes, wherein
the optical multiplexer and the driving circuit are integrated with each other with the driving circuit disposed on a front side and the optical multiplexer disposed on a rear side of one silicon substrate, wherein
the optical multiplexer includes:
a plurality of filters that are positioned in a manner facing the respective laser diodes, and each of which transmits a wavelength of signal light output from the laser diode facing thereto, and that reflects optical signals having wavelengths other than the wavelength of the signal light output from the laser diode facing thereto; and a multiplexing element that multiplexes the optical signals having transmitted through the respective filters, and the optical signals reflected by the respective filters, one after another, and that outputs the multiplexed optical signals as an optical transmission signal, wherein the plurality of filters are disposed along a side facing the laser diodes in the driving circuit, in a manner facing the respective laser diodes, wherein the optical multiplexer includes a mirror, which is a reflector element that is disposed in a manner extending along a side of the driving circuit facing the side along which the plurality of filters are disposed, wherein the optical transmitter further includes a concave mirror that enables the light output from the respective laser diodes to become incident on the respective filters, wherein the optical transmitter uses the concave mirror that is positioned below the laser diodes, as an optical element for collimating the optical signals output from the laser diodes.

8. The optical transmitter according to claim 1, wherein a spot-size converter is provided on one end of each of a plurality of waveguides on a waveguide substrate, being an end on a side of the laser diodes.

\* \* \* \* \*